(12) United States Patent
Wada et al.

(10) Patent No.: US 11,414,058 B2
(45) Date of Patent: Aug. 16, 2022

(54) PARKING BRAKE DEVICE

(71) Applicant: KABUSHIKI KAISHA TOYOTA JIDOSHOKKI, Kariya (JP)

(72) Inventors: Kenichi Wada, Aichi-ken (JP); Satoru Masuda, Kanagawa (JP); Tomoya Sugiyama, Kanagawa (JP); Koichi Kuboniwa, Kanagawa (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 17/359,795

(22) Filed: Jun. 28, 2021

(65) Prior Publication Data
US 2021/0402964 A1 Dec. 30, 2021

(30) Foreign Application Priority Data
Jun. 30, 2020 (JP) .............................. JP2020-112546

(51) Int. Cl.
*B60T 7/10* (2006.01)
*F16C 1/12* (2006.01)

(52) U.S. Cl.
CPC ................ *B60T 7/105* (2013.01); *F16C 1/12* (2013.01)

(58) Field of Classification Search
CPC . B60T 7/105; B60T 7/102; B60T 7/10; B60T 7/104; F16C 1/12
See application file for complete search history.

(56) References Cited

U.S. PATENT DOCUMENTS 5,065,643 A * 11/1991 Axtell ...................... G05G 5/06
74/523
6,223,624 B1 5/2001 Iwanaga et al.

FOREIGN PATENT DOCUMENTS

| DE | 2609172 A * | 9/1977 | .............. B60T 7/105 |
| DE | 10260356 A1 * | 7/2004 | .............. B60T 11/046 |
| FR | 2536714 A * | 6/1984 | .............. B60T 11/08 |
| JP | 3542718 B2 | 7/2004 | |

* cited by examiner

*Primary Examiner* — Thomas C Diaz
(74) *Attorney, Agent, or Firm* — Sughrue Mion, PLLC

(57) ABSTRACT

A parking brake device includes a toggle mechanism including a base member, a connecting member, a brake lever, a junction member that connects an intermediate position of the brake lever with the connecting member. The junction member includes two junction parts that are connected to each other and are rotatable relative to each other. During a process of an operation of the braking lever from a non-operating state of the parking brake device to an operating state of the parking brake device, the two junction parts integrally rotate when an operation angle of the brake lever is equal to or less than a predetermined angle, and one of the two junction parts connected to the intermediate position of the brake lever is rotatable about a connecting portion where the two junction parts are connected.

2 Claims, 6 Drawing Sheets

10...PARKING BRAKE DEVICE
20... BASE MEMBER
30...BRAKE LEVER
43...JOINT MEMBER
431...FIRST JOINT PART
432...SECOND JOINT PART
430A...CONNECTING PORTION
44...CONNECTING MEMBER
C...CABLE

10...PARKING BRAKE DEVICE
20... BASE MEMBER
30...BRAKE LEVER
43...JOINT MEMBER
431...FIRST JOINT PART
432...SECOND JOINT PART
430A...CONNECTING PORTION
44...CONNECTING MEMBER
C...CABLE

PARKING BRAKE DEVICE

BACKGROUND ART

The present disclosure relates to a parking brake device.

Japanese Patent No. 3542718, which has been proposed by the present applicant, discloses an example of a conventional parking brake device that has a configuration having a toggle link mechanism.

In general, the toggle link mechanism includes technical features; (1) capability of achieving a high lever ratio, and (2) capability of using a lock mechanism adopting a dead point. According to these features, the parking brake device using the toggle link mechanism does not require a ratchet or a pole which are provided in a parking brake device for a general four-wheeled vehicle. As a result, heat treatment such as quenching performed on a portion where the ratchet and the pole are engaged is not required, so that the structure can be simplified, and workability can be improved.

The above-described conventional technique can achieve a high lever ratio, but the output stroke becomes small. Thus, a predetermined output may not be obtained by the above-described conventional technique.

This problem relates to output rigidity. Specifically, the output is determined depending on the stroke, so that a large output cannot be obtained even with a high lever ratio if the stroke is small. Although a high lever ratio and a large stroke are required to obtain a predetermined output, the high lever ratio results in a decrease in stroke. Therefore, it has been difficult to achieve both the high lever ratio and the large stroke.

The present disclosure, which has been made in view of the above-described problems of the conventional technique, is directed to providing a parking brake device capable of achieving both a high lever ratio related to a small operation force, and a large stroke related to a large output.

SUMMARY

In accordance with an aspect of the present disclosure, there is provided a parking brake device including a toggle mechanism. The junction member includes two junction parts that are connected to each other and are rotatable relative to each other. The two junction parts integrally rotate when an operation angle of the brake lever is equal to or less than a predetermined angle, during a process of an operation of the braking lever from a non-operating state of the parking brake device where braking is not applied by the parking brake device to an operating state of the parking brake device where braking is applied by the parking braking device applies braking. One of the two junction parts connected to the intermediate position of the brake lever is rotatable about a connecting portion where the two junction parts are connected when the operation angle of the brake lever exceeds a predetermined angle, during the process of the operation of the braking lever from the non-operating state of the parking brake device to the operating state of the parking brake device.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

An embodiment of the present disclosure will be described below with reference to the drawings.

FIGS. 1 to 4 illustrate the embodiment of the present disclosure.

Figure 1:
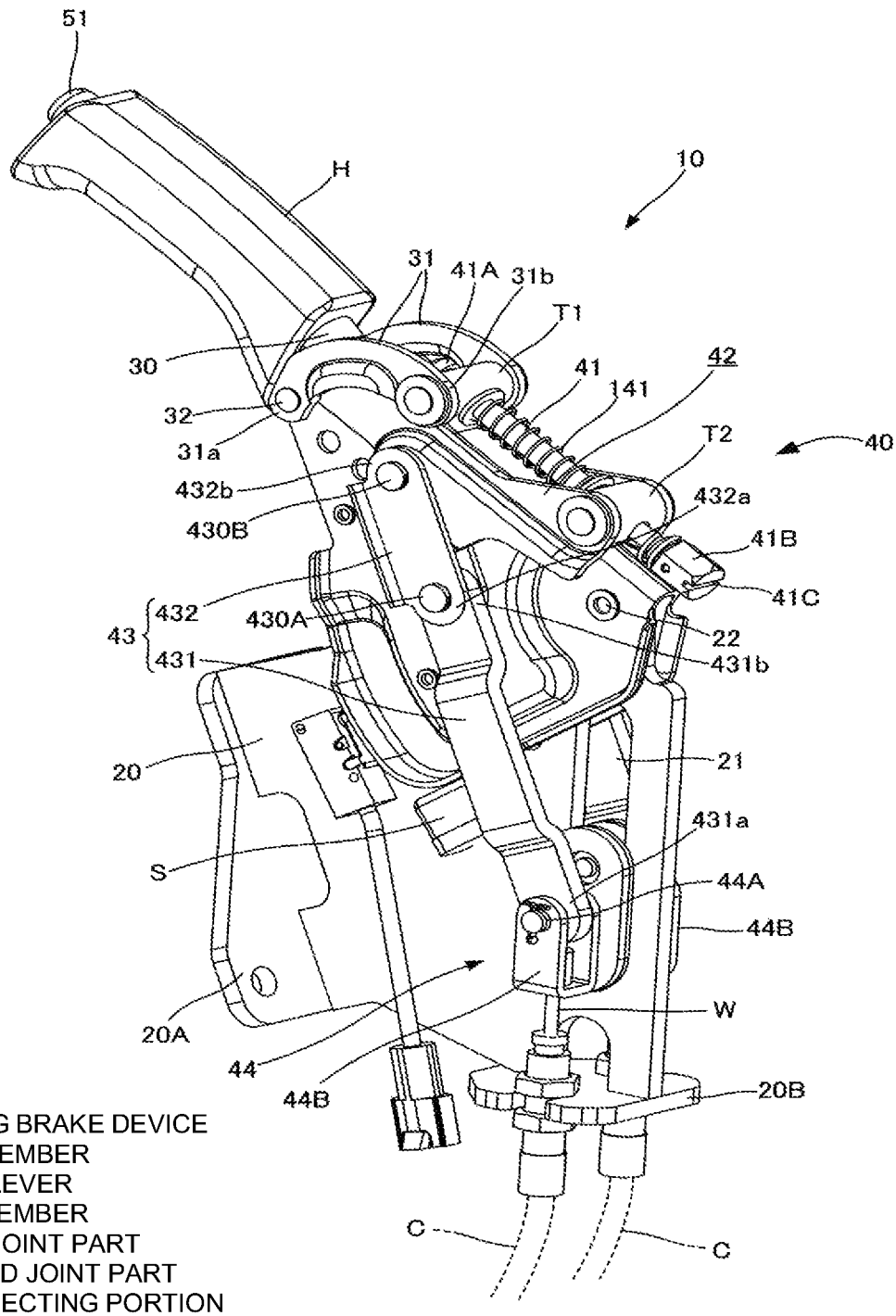
FIG. 1 is a perspective view illustrating a parking brake device according to an embodiment of the present disclosure.
Figure 2:
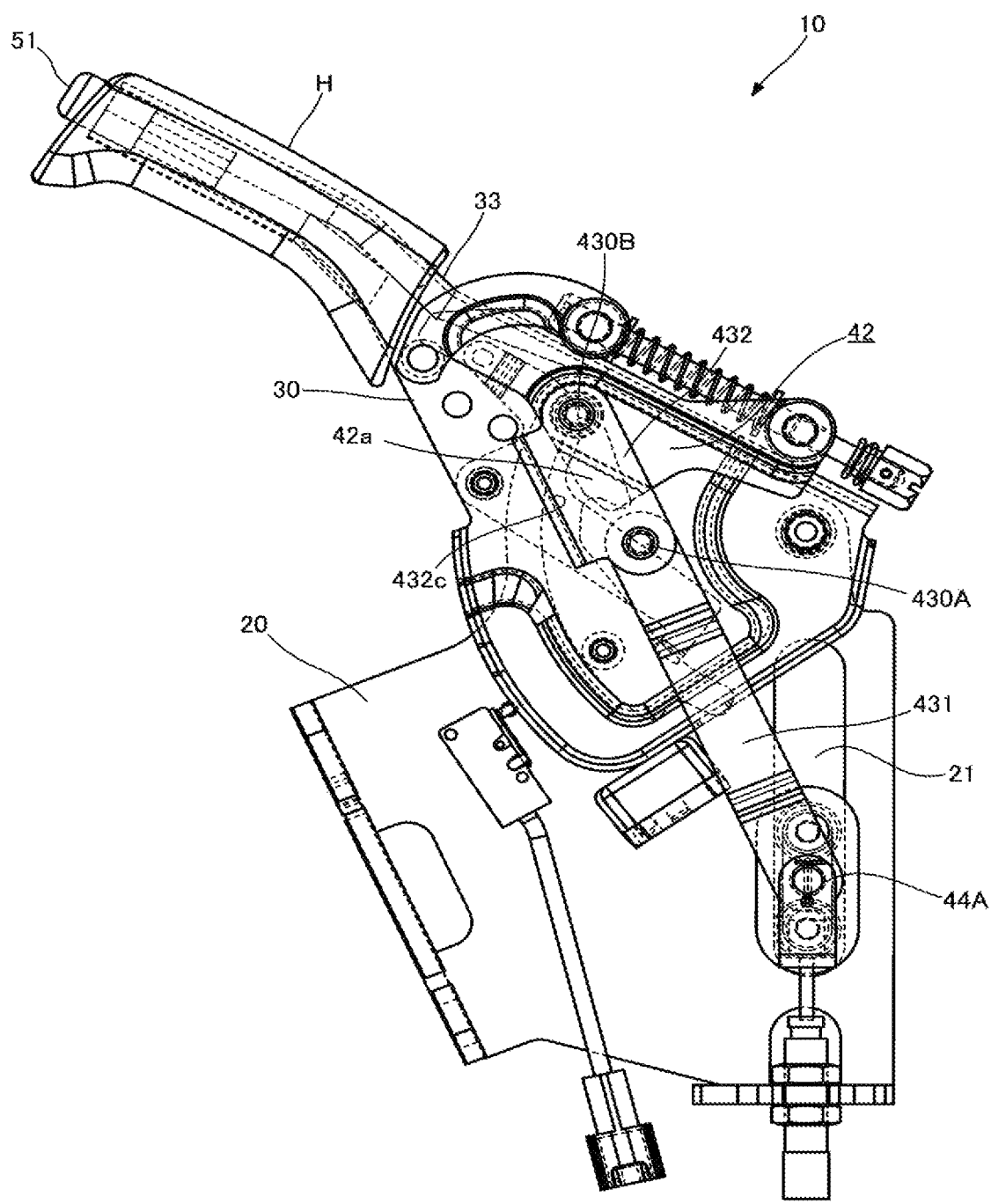
FIG. 2 is a side view of the parking brake device of FIG. 1 when the brake is in an inactive.

FIG. 1 is a perspective view of a parking brake device according to the embodiment of the present disclosure. FIG. 2 is a side view of the parking brake device in a non-operating state. In other words, FIG. 2 illustrates a state where the parking brake device is at an initial position.

Figure 3:
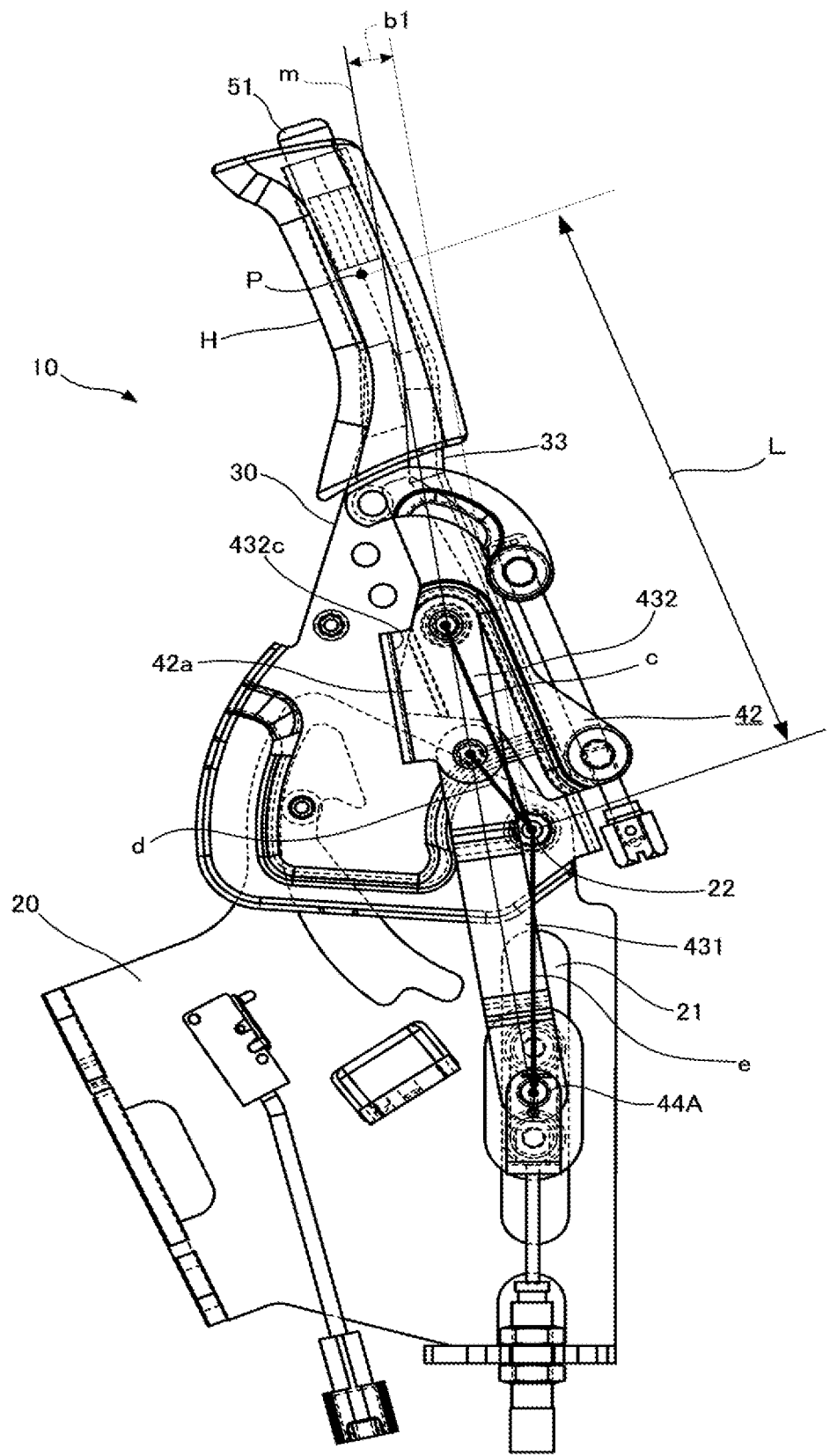
FIG. 3 is a side view illustrating the parking brake device under a process of operating a brake lever.
Figure 4:
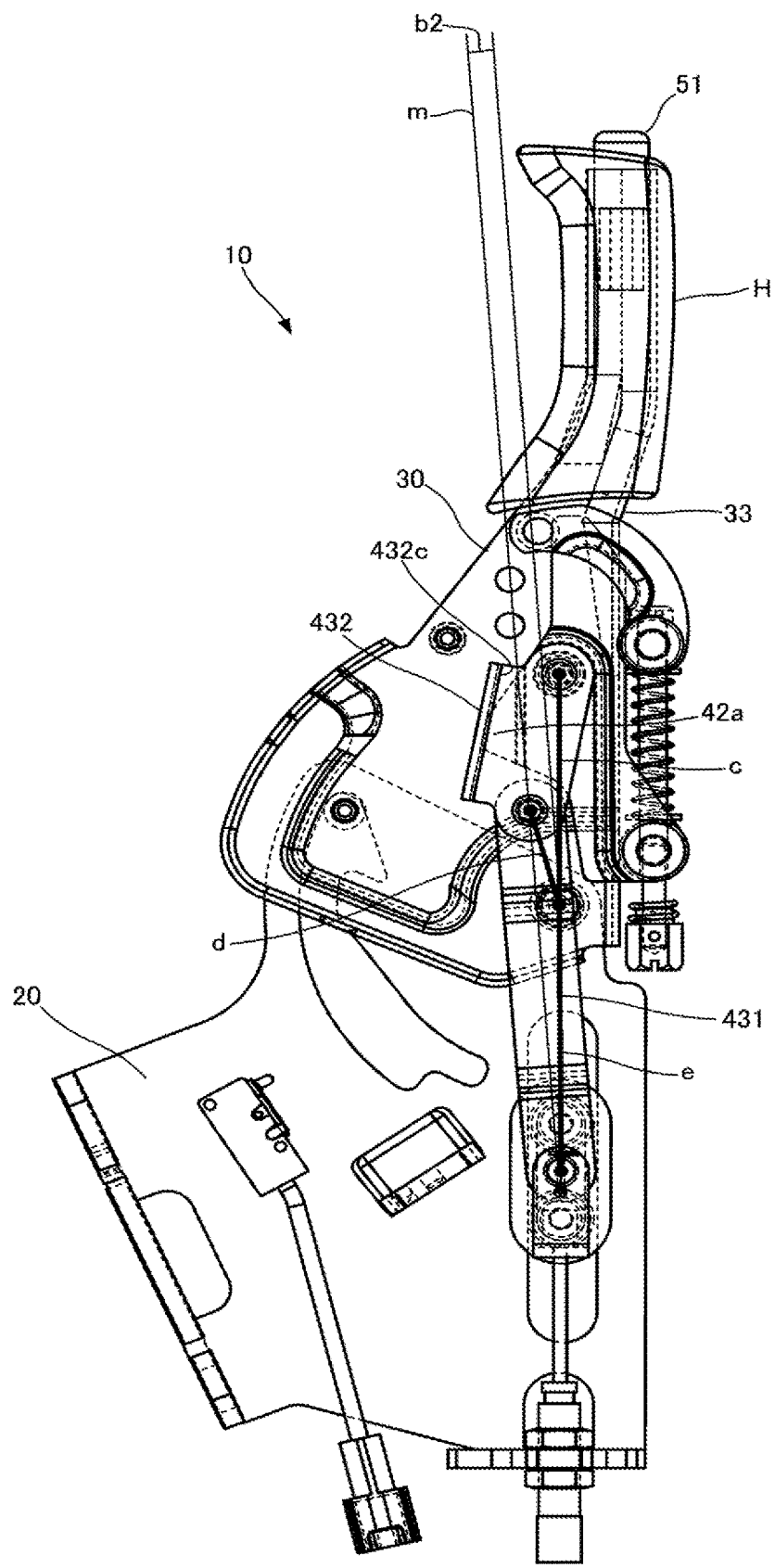
FIG. 4 is a side view illustrating the parking brake device when the brake lever is at the maximum operation angle.

FIG. 3 is a side view illustrating a state of the parking brake device while a brake lever is operated from the initial state illustrated in FIG. 2. FIG. 4 is a side view illustrating a state of the parking device where the brake lever is operated to the maximum operation angle. Thus, FIG. 4 illustrates a state the parking brake device where the maximum braking force is applied by the parking brake device.

As illustrated in FIG. 1, a parking brake device 10 includes a toggle mechanism that includes a base member 20, a connecting member 44 to which a cable C is connected and that is slidably movably supported by the base member 20, a brake lever 30 that is rotatably attached to an attachment portion 22 in the vicinity of an the extension of a vertical direction in which the connecting member 44 slidably moves so as to be tiltable about the extension of the vertical direction in which the connecting member slidably moves, and a junction member 43 that connects the connecting member 44 and an intermediate position of the brake lever 30.

The junction member 43 has a divisional link structure including a first junction part 431 and a second junction part 432, which are two junction parts rotatably connected to each other, which will be described later.

A handle H is provided on a distal end of the brake lever 30 so as to be easily held during an operation. An unlock button 51 is provided in an end portion of the handle H, which is used to unlock the brake lever 30 when the parking brake device 10 in an operating state where braking is applied by the parking brake device 10. A release rod (not illustrated) is connected to the unlock button 51.

The base member 20 has a fixing portion 20A that is fixed to a predetermined location with a bolt or the like. A slide hole 21 extending vertically long is formed in the base member 20, and a slide pin 44A forming a part of the connecting member 44 is slidably inserted through the slide hole 21. Thus, the connecting member 44 is movable vertically along the slide hole 21.

The base member 20 further includes cable attachment members 44B for guiding wires W forming the cables C straightly toward the slide pin 44A in the same direction as the longitudinal direction of the slide hole 21. A stopper S is provided between the fixing portion 20A and the slide hole 21. The stopper S is placed in contact with a part of the brake lever 30 so as to support the brake lever when the parking brake device 10 is in a non-operating state where braking is not applied by the parking brake device 10. The stopper S has, for example, a contact portion made of hard rubber.

The parking brake device 10 includes a tension adjusting mechanism 40 that adjusts the tension of the cable C. The tension adjusting mechanism 40 is configured to adjust the tension of the cable C by changing the position of the junction member 43, and includes an adjustment link member 42 is connected to the junction member 43 so as to be interposed between the brake lever 30 and the junction member 43 and, a regulating link member 31 that holds the adjustment link member 42, and a screw member 41 for regulates the position of the adjustment link member 42.

The regulating link member 31 includes a pair of curved plate-shaped links disposed on opposite sides of the brake lever 30. The regulating link member 31 has proximal end portions 31a rotatably attached to an intermediate portion of the brake lever 30 by a connecting pin 32, and other end portions 31b disposed opposite ends of a first trunnion pin T1 so as to hold therebetween the first trunnion pin T1. The other end portions 31b are rotatably supported by the opposite end portions of the first trunnion pin T1. The first trunnion pin T1 is disposed at a position to be in contact with a side end edge 33 of the brake lever 30.

The first junction part 431, which is one of the two junction parts of the junction member 43, has one end 431a rotatably connected to the connecting member 44 with the slide pin 44A, and the other end 431b rotatably connected to one end 432a of the second junction part 432, which is the other of the two junction parts of the junction member 43, with a connecting pin 430A.

Thus, the first junction part 431 and the second junction part 432 are rotatable relative to each other about the connecting pin 430A. The second junction part 432 has the other end 432b rotatably connected to the adjustment link member 42 with a connecting pin 430B. The adjustment link member 42 includes a pair of plates disposed on the opposite sides of the brake lever 30 at a substantially middle portion thereof. The junction member 43 connects the intermediate position of the brake lever 30 with the connecting member 44.

The second junction part 432 has a substantially U-shape in cross section. An inner bottom surface of the U-shape of the second junction part 432 will be referred to as an inner bottom surface 432c. The inner bottom surface 432c is set to be in contact with a stopper 42a of the adjustment link member 42, when the operation angle of the brake lever 30 reaches a predetermined operation angle illustrated in FIG. 3 during the process of the operation of the brake lever 30 from the non-operating state of the parking brake device 10 to the operating state of the parking brake device 10, which will be described later. Hereinafter, the predetermined operation angle is referred to as a boundary angle.

As illustrated in FIGS. 1 to 4, the adjustment link member 42 is disposed rearward of the regulating link member 31 with respect to the handle H of the brake lever 30. The adjustment link member 42 includes plates attached to the opposite sides of the substantially intermediate portion of the brake lever 30. The other end 432b of the second junction part 432 is rotatably connected to the one end of the adjustment link member 42.

The other end of the adjustment link member 42 is connected to a second trunnion pin T2 so that the other end of the adjustment link member 42 is slidably in contact with the side end edge 33 of the brake lever 30. The one end of the adjustment link member 42 is fittingly inserted between the connecting pin 32 by which the regulating link member 31 is attached to the brake lever 30 and the first trunnion pin T1. The one end of the adjustment link member 42 is in contact with and supported by the connecting pin 32.

As has been described, the second junction part 432 has a U-shape in cross section, and the inner bottom surface 432c of the second junction part 432 is placed in contact with the stopper 42a of the adjustment link member 42 while the brake lever 30 is operated to an angle greater than the boundary angle.

A contact state where the one end of the adjustment link member 42 is fittingly inserted between the connecting pin 32 and the first trunnion pin T1 is maintained even when the distance from the second junction part 432 to the adjustment link member 42 becomes maximum. Accordingly, the adjustment link member 42 is mounted on the brake lever 30 so as to be movable in an adjustable manner along the extending direction of an output axis that is a direction in which the cable C is pulled. In other words, the adjustment link member 42 moves on an axis displaced from the output axis.

The screw member 41 has a bolt shape, and has a distal end inserted through the first trunnion pin T1. A detachment prevention portion 41A is provided in the distal end of the screw member 41 so as to prevent the screw member 41 from being detached from the first trunnion pin T1. The detachment prevention portion 41A is larger than a through hole of the first trunnion pin T1 through which the screw member 41 is inserted.

The screw member 41 has a threaded section from an intermediate part to the proximal end thereof. The threaded section is screwed to the second trunnion pin T2 with the proximal end of the screw member 41 inserted through the second trunnion pin T2. A helical screw 141 is wound around a section of the screw member 41 between the first trunnion pin T1 and the second trunnion pin T2.

A gripping portion 41B for turning the screw member 41 is fixed to the proximal end of the screw member 41. The gripping portion 41B is formed into such dimensions and shape (a hexagonal nut shape in the present embodiment) so that the gripping portion 41B is not taken out from the screw hole of the second trunnion pin T2 and is easily gripped. The gripping portion 41B has a slotted groove 41C so as to be turned by a flathead screwdriver.

In this manner, the screw member 41 is interposed between the adjustment link member 42 and the brake lever 30, and is used for moving and restricting the position of the adjustment link member 42 by changing the distance between the first trunnion pin T1 and the second trunnion pin T2 by way of screwing.

The other end 431b of the first junction part 431 is rotatably connected to the one end 432a of the second junction part 432 that is rotatably attached to the adjustment link member 42. The slide pin 44A of the connecting member 44 is rotatably supported by the one end 431a of the first junction part 431 with the slide pin 44A disposed extending through the slide hole 21.

The cable attachment members 44B are attached to the slide pin 44A on both left and right sides of the base member 20 with the slide hole 21 provided between the cable attachment members 44B. One cable C (more specifically, a wire W of the cable C) is connected to each of the cable attachment members 44B. The other end of the cable C is connected to a braking device (not illustrated).

Next, the operation of the parking brake device 10 will be described.

As illustrated in FIG. 2, when the parking brake device 10 is in the initial state, the slide pin 44A, the connecting pin 430A, and the connecting pin 430B are positioned linearly, and the first junction part 431 and the second junction part 432 are united generally linearly. In this state, the stopper 42a of the adjustment link member 42 is not in contact with the inner bottom surface 432c of the second junction part 432.

As the brake lever 30 is operated from the initial state so as to apply braking, the parking brake device 10 is in a state illustrated in FIG. 3 when the brake lever 30 reaches the boundary angle. In this state, the slide pin 44A is pulled up to the upper side of the slide hole 21, and a braking force of the parking brake device 10 is produced. At this time, the slide pin 44A, the connecting pin 430A, and the connecting pin 430B are still positioned linearly, and the first junction part 431 and the second junction part 432 remain being united generally linearly.

The state of the parking brake device 10 illustrated in FIG. 3 is a state where the stopper 42a of the adjustment link member 42 is in contact with the inner bottom surface 432c of the second junction part 432. From the initial state of the parking brake device 10 illustrated in FIG. 2 to the state of the parking brake device 10 illustrated in FIG. 3, the first junction part 431 and the second junction part 432 of the junction member 43 remain being united generally linearly due to the tension from the cable C produced by an input force through the brake lever 30. Therefore, the junction member 43, with the first junction part 431 and the second junction part 432 united linearly, moves relatively to the adjustment link member 42 with the connecting pin 430B as the rotation center.

FIG. 4 illustrates a state of the parking brake device 10 when the brake lever 30 is at the maximum operation angle with the operation of the brake lever 30. In this state, the maximum braking force by the parking brake device 10 is achieved. The tension from the cable C causes the stopper 42a of the adjustment link member 42 to be in contact with the inner bottom surface 432c of the second junction part 432, so that the second junction part 432 and the adjustment link member 42 are kept united from the state illustrated in FIG. 3 to the state illustrated in FIG. 4.

Thus, with the operation of the brake lever 30, the second junction part 432 and the adjustment link member 42 rotates relative to each other about the connecting pin 430A connecting the first junction part 431 with the second junction part 432 as the rotation center.

Figure 5:
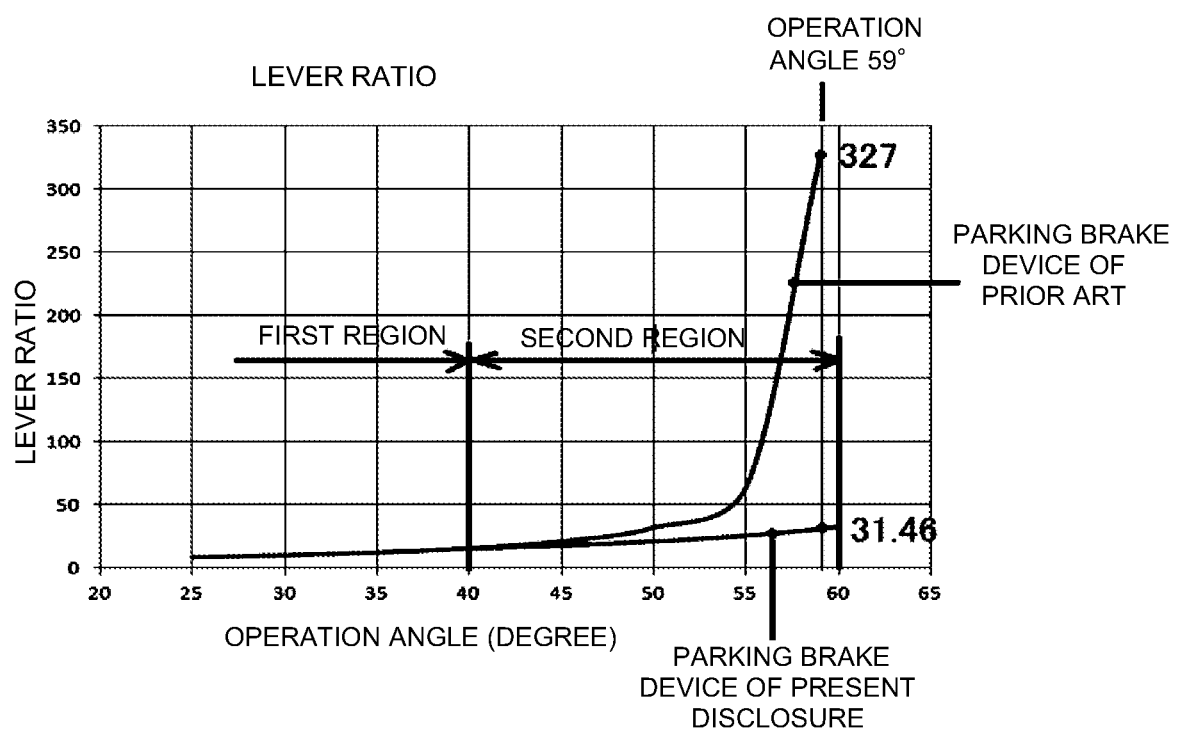
FIG. 5 is a chart showing a relationship between an operation angle of an operation lever and a ratio.
Figure 6:
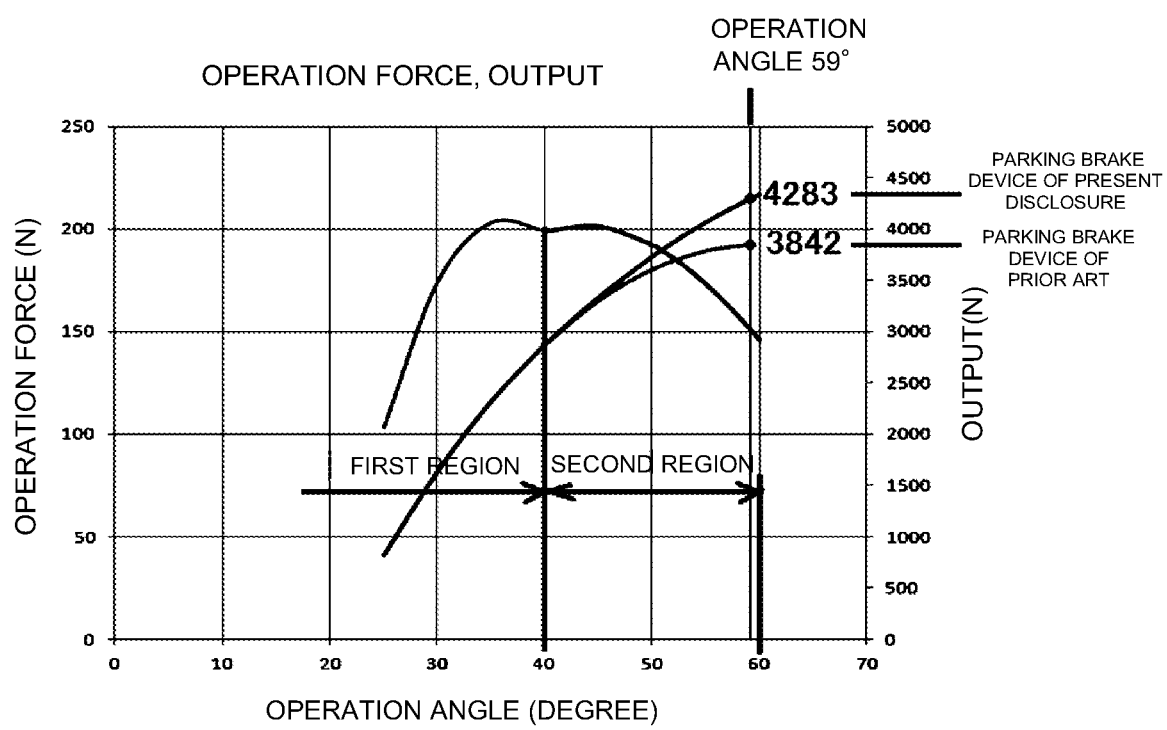
FIG. 6 is a chart showing a relationship among an operation angle of the operation lever, an operation force, and an output.

FIG. 5 is a chart showing the relationship between the operation angle of the brake lever 30 and a lever ratio. FIG. 6 is a chart showing the operation angle of the brake lever 30, an operation force, and an output force.

In FIGS. 5 and 6, a region defined as a "region 1" indicates transition from the state illustrated in FIG. 2 to the state illustrated in FIG. 3, and a region defined as a "region 2" indicates transition from the state illustrated in FIG. 3 to the state illustrated in FIG. 4.

In FIG. 3, a reference character "L" denotes a distance from the attachment portion 22 to an operation point P. In FIGS. 3 and 4, a reference character "m" denotes an output action line. Reference characters "b1" in FIG. 3 and "b2" in FIG. 4 indicate a distance from the attachment portion 22 of the brake lever 30 to the output action line m. Thus, the lever ratio in the region 1 is L/b1, and the lever ratio in the region 2 is L/b2.

Further, in FIG. 3, a reference character "c" denotes a line representing a distance from the attachment portion 22, which serves as the rotation center of the parking brake device 10, to the connecting pin 430B connecting the adjustment link member 42 with the second junction part 432, and a reference character "d" denotes a line representing a distance from the attachment portion 22 to the connecting pin 430A connecting the second junction part 432 with the first junction part 431. Furthermore, a reference character "e" denotes a line representing a distance between the slide pin 44A and the attachment portion 22.

In the state illustrated in FIG. 3, the angle formed by the line e and the line d is greater than the angle formed by the line c and the line d. Thus, a change in the lever ratio becomes small and a change in the stroke become greater from the state illustrated in FIG. 3 as a point of a change. Thus, the output becomes large.

According to the parking brake device 10 of the present disclosure having such characteristics, the lever ratio does not sharply increase even with the operation of the brake lever 30 in the region 2 as illustrated in FIG. 5. According to the conventional technique, on the other hand, the lever ratio sharply increases from an angle beyond the boundary angle of 40° and near 50°.

FIG. 6 shows the characteristics of the operation force and the output force relative to the operation angle. In this example, the parking brake device is adjusted so that the state of the parking brake device 10 illustrated in FIG. 3 is accomplished when the brake lever 30 is at the boundary angle of 40°, and the maximum operation angle is set at 59°. As can be seen in FIG. 6, the output at the maximum operation angle is 3842 N according to the conventional example, meanwhile the output at the maximum operation angle is 4283 N according to the parking brake device of the present disclosure.

Accordingly, the parking brake device 10 of the present disclosure achieves a high lever ratio and a large output.

The parking brake device 10 of the present disclosure offers the following operational effects.

According to the parking brake device 10 of the present embodiment, when the brake lever 30 is operated from a non-operating state where braking is not applied by the parking brake device 10, the operation force of the brake lever is transmitted to the junction member 43 formed by the two junction parts 431, 432 and the connecting member 44. The connecting member 44 operates so as to pull the cable C connected to the connecting member 44. As a result, the parking brake device 10 starts applying braking.

The two junction parts 431, 432 of the junction member 43 operate integrally as one unit. Specifically, for example, the two junction parts 431, 432 of the junction member 43 rotate about the connecting pin 430B, where the junction member 43 is connected to the adjustment link member 42, as the rotation center with respect to the brake lever 30. After the brake lever 30 is further operated and the operation angle reaches the predetermined angle, only the link 432 of the two junction parts 431, 432, which is connected to the intermediate position of the brake lever 30, rotates about the connecting portion (the connecting pin 430A) where the two junction parts 431, 432 are connected.

According to such a configuration, a change in the lever ratio of the parking brake device 10 of the present embodiment becomes smaller than a change in the lever ratio of the conventional technique during the operation of the brake lever 30 before the operation angle of the brake lever 30 reaches the predetermined angle, so that the stroke may be increased.

Therefore, even with the operation force the same as the conventional parking brake device, a greater output force may be obtained by the parking brake device 10 of the present embodiment when the operation lever is operated to the operation angle greater than the predetermined angle. In other words, even with the same operating force, a larger braking force can be obtained by the parking brake device of the present embodiment than by the conventional parking brake device.

According to the parking brake device 10 of the present embodiment, the two junction parts 431, 432 of the junction member 43 include the first junction part 431 having one end 431*a* rotatably connected to the connecting member 44 and the second junction part 432 having the one end 432*a* rotatably connected to the other end 431*b* of the first junction part 431 and the other end 432*b* rotatably connected to the intermediate position of the brake lever 30. Thus, the configuration becomes simple, and an increase in risk of failure and an increase in cost may be suppressed.

Although an embodiment of the present disclosure has been described with reference to the drawings, the configuration is not limited to the above-described embodiment. The present disclosure intends to include various modifications and additions without departing from the scope of the present disclosure. For example, although the configuration in which the state illustrated in FIG. 3 is accomplished when the brake lever 30 is at the boundary angle of 40°, and the maximum operation angle is at 59° has been described above, values of the angles may be changed.

The lever ratio can be adjusted by the dimensions of the components or the boundary angle in the state illustrated in FIG. 3.

The parking brake device according to the present disclosure can be widely adopted devices including a toggle link.

What is claimed is:

1. A parking brake device comprising:
a toggle mechanism including a base member, a connecting member that is slidably movably supported by the base member and to which a cable is connected, a brake lever that is rotatably attached to the base member so as to be tiltable about a position on an extension of a vertical direction in which the connecting member slidably moves, and a junction member that connects an intermediate position of the brake lever with the connecting member, wherein
the junction member includes two junction parts that are connected to each other and are rotatable relative to each other,
the two junction parts integrally rotate from when the parking brake device is in a non-operating state to when an operation angle of the brake lever reaches a predetermined angle, during a process of moving the parking brake device from the non-operating state to an operating state with an operation of the brake lever, and
one of the two junction parts connected to the intermediate position of the brake lever is rotatable about a connecting portion where the two junction parts are connected when the operation angle of the brake lever exceeds the predetermined angle, during the process of moving the parking brake device from the non-operating state to the operating state with the operation of the brake lever.

2. The parking brake device according to claim 1, wherein the two junction parts include:
a first junction part having one end rotatably connected to the connecting member, and
a second junction part having one end rotatably connected to the other end of the first junction part and the other end of the second junction part rotatably connected to the intermediate position of the brake lever.

* * * * *